(12) United States Patent
Dluzneski

(10) Patent No.: US 7,705,091 B2
(45) Date of Patent: Apr. 27, 2010

(54) METHOD OF INCREASING THE ABSORPTION RATE OF PEROXIDES INTO POLYMER PARTICLES

(75) Inventor: Peter R. Dluzneski, Harleysville, PA (US)

(73) Assignee: Arkema Inc., Philadelphia, PA (US)

( * ) Notice: Subject to any disclaimer, the term of this patent is extended or adjusted under 35 U.S.C. 154(b) by 783 days.

(21) Appl. No.: 11/562,109

(22) Filed: Nov. 21, 2006

(65) Prior Publication Data

US 2007/0132136 A1 Jun. 14, 2007

Related U.S. Application Data

(62) Division of application No. 11/124,796, filed on May 9, 2005, now Pat. No. 7,160,958.

(51) Int. Cl.
*C08F 8/06* (2006.01)
*C08C 19/04* (2006.01)

(52) U.S. Cl. ............... 525/383; 525/326.1; 526/348

(58) Field of Classification Search .............. 525/383, 525/326.1; 526/348
See application file for complete search history.

(56) References Cited

U.S. PATENT DOCUMENTS

| | | | |
|---|---|---|---|
| 3,455,752 A | 7/1969 | Gray et al. | |
| 4,101,512 A | 7/1978 | Schmidt et al. | |
| 4,268,637 A | 5/1981 | Weldy | |
| 6,395,791 B1 | 5/2002 | Chaudhary et al. | |
| 7,160,958 B2 | 1/2007 | Dluzneski | |

FOREIGN PATENT DOCUMENTS

| | | | |
|---|---|---|---|
| CA | 2015302 | * | 10/1991 |
| EP | 0 306 236 | * | 3/1989 |
| EP | 0306236 A2 | | 3/1989 |
| EP | 0572028 A1 | | 12/1993 |
| EP | 1457518 A1 | | 9/2004 |
| JP | 02-140246 | * | 5/1990 |
| JP | 2140246 | | 5/1990 |
| WO | 02068530 A2 | | 9/2002 |

OTHER PUBLICATIONS

Japanese Patent Abstract Publication No. 02-140246 published May 29, 1990, one page.

* cited by examiner

*Primary Examiner*—Ling-Siu Choi
(74) *Attorney, Agent, or Firm*—Steven D. Boyd

(57) ABSTRACT

The present invention provides a method of increasing the absorption rate of peroxides into polymer particles used to fabricate electrical cable insulation. The method includes contacting the polymer particles with a peroxide compound and an additive under physical mixing conditions at a temperature that is above the melting point of the peroxide compound but below the softening point of the polymer particles for a period of time sufficient to allow the peroxide compound to absorb into the polymer particles. Preferably, the additive is squalane or another branched, hydrocarbon oil that substantially increases the rate at which the peroxide compound is absorbed into the polymer particles and improves the peroxide cure.

18 Claims, No Drawings

METHOD OF INCREASING THE ABSORPTION RATE OF PEROXIDES INTO POLYMER PARTICLES

CROSS-REFERENCE TO RELATED APPLICATION

This application is a division of U.S. patent application Ser. No. 11/124,796, filed May 9, 2005, now U.S. Pat. No. 7,160,958

BACKGROUND OF THE INVENTION

1. Field of Invention

The present invention relates to a method of increasing the absorption rate of peroxides into polymer particles used to form electric cable insulation.

2. Description of Related Art

Peroxide compounds are commonly used to cross-link (vulcanize) polymers. In some cross-linked polymer compositions, the peroxide compound is introduced into the polymer through a milling process. However, in the preparation of polymer particles used to form electric cable insulation, the peroxide compound is more commonly introduced into polymer particles through an absorption/coating process such as described in Gray et al., U.S. Pat. No. 3,455,752, which is hereby incorporated by reference in its entirety. Use of an absorption/coating process prevents premature decomposition of the peroxide during processing of the polymer particles.

In the absorption/coating process, solid, pre-formed polymer particles (e.g., granules or pellets) that comprise one or more melt-blended polymers and other optional materials (e.g., anti-oxidants, pigments, fillers etc.) are contacted under physical mixing conditions with at least one peroxide compound at a temperature above the melting point of the peroxide compound but below the softening point of the polymer particles. For example, dicumyl peroxide, which has a melting point within the range of 39-41° C., can be contacted with and absorbed into olefin-containing polymer particles using the absorption/coating process at temperatures between about 40° C. and 80° C. Very little of the dicumyl peroxide decomposes at these temperatures, particularly at the lower end of the temperature range.

Once the peroxide compound has been sufficiently absorbed into the polymer particles, the peroxide-containing polymer particles can be used immediately to coat conductor wires or bundles, or they can be permitted to cool to ambient temperatures and stored for later use. The peroxide-containing polymer particles are particularly useful for forming the polymeric insulation layer on electrical power transmission cables. Wire and cable manufacturers typically feed the peroxide-containing polymer particles into a system in which the peroxide-containing polymer particles are melted in a screw feed and extruded coaxially onto a wire conductor or wire bundle. The polymer-coated wires are then passed through a long heated tube called a catenary. Temperatures in the catenary are sufficiently high to cause the peroxide in the extruded polymer to decompose and thereby cross-link the polymer. Cross-linking is necessary for power cable insulation because the cables can become hot during use due to resistive heating and environmental conditions. If the polymeric insulation was not cross-linked, then the polymeric insulation could melt or soften, which could cause the electrical cable to fail.

Although the absorption/coating process is advantageous in that it prevents the premature decomposition of the peroxide, it tends to be a time-consuming process step. The molten peroxide must be in contact with the polymer particles under mixing conditions at elevated temperatures for a significant period of time in order to obtain adequate coating and absorption of the peroxide into the polymer particles. Contact periods from ten minutes to one hour are typical, which makes the absorption/coating process a rate determining step in the fabrication of peroxide-containing polymer particles.

Three factors that are known to affect the rate at which peroxide compounds absorb into polymer particles are: (1) the temperature at which the peroxide compound and the polymer particles are contacted together; (2) the physical characteristics of the polymer; and (3) the molecular weight of the peroxide compound. Higher contact temperatures tend to increase the rate of absorption. More crystalline polymers such as polyethylene tend to absorb peroxides more slowly than relatively amorphous polymers such as ethylene-propylene rubber. And, lower molecular weight peroxide compounds tend to absorb into polymer particles at a more rapid rate than higher molecular weight peroxide compounds.

Unfortunately, it is not commercially feasible to increase the rate of absorption of peroxide compounds in polymer particles by manipulating these three factors. Increasing the temperature at which the peroxide compound and the polymer particles are contacted disadvantageously increases the energy costs associated with the process, increases the risk of premature decomposition of the peroxide compound and might require prohibitively expensive modifications to existing processing equipment. It is also not commercially feasible to alter the composition of the polymers or peroxide compounds used to manufacture polymer particles used to form electric cable insulation because of cost issues and the potential for detrimental changes in electrical insulation performance.

BRIEF SUMMARY OF THE INVENTION

The present invention provides a method of increasing the absorption rate of peroxides into polymer particles used to fabricate electrical cable insulation. The method comprises contacting the polymer particles with a peroxide compound and an absorption-promoting additive under physical mixing conditions at a temperature that is above the melting point of the peroxide compound but below the softening point of the polymer particles for a period of time sufficient to allow the peroxide compound to absorb into the polymer particles. The presence of the absorption-promoting additive, which preferably comprises a branched, hydrocarbon oil, substantially increases the rate at which the peroxide compound is absorbed into the polymer particles.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

As noted above, applicants have discovered that when polymer particles are contacted with a peroxide compound and a relatively small amount of an absorption-promoting additive comprising a branched, hydrocarbon oil under physical mixing conditions at a temperature that is above the melting point of the peroxide compound but below the softening point of the polymer particles, the rate at which the peroxide compound is absorbed into the polymer particles is substantially increased as compared to when the absorption-promoting additive is not present. One absorption-promoting additive that is particularly suitable for use in the method of the invention is squalane (CAS#111-01-3). Squalane is a polyterpene hydrocarbon ($C_{30}H_{62}$) obtained principally from shark livers. It is a nonvolatile (boiling point=176° C. at 0.05 mm Hg), saturated, branched hydrocarbon that has a molecular weight of about 422 g/mole and is a liquid at ambient temperatures (melting point=−38° C.). It is non-toxic and is sometimes used in the cosmetic and pharmaceutical industries.

As illustrated in the accompanying Examples, the presence of a relatively small amount of squalane significantly increases the rate at which peroxide compounds are absorbed into polymer particles. Furthermore, because it allows for faster absorption at lower processing temperatures, it increases the degree of cross-linking, which is also referred to as peroxide cure. Thus, the use of squalane allows for use of less of the peroxide compound to achieve the same degree of peroxide cure. And use of less of the peroxide compound further decreases the time necessary to obtain complete absorption of the peroxide compound during the coating/absorption process.

Other absorption-promoting additive compounds can be used instead of or in addition to squalane to obtain the increased absorption rate benefits. Such alternative absorption-promoting additives are preferably simple, non-polar hydrocarbons. Polar hydrocarbons, particularly those with heteroatoms, may compromise the electrical resistance of cable insulation in alternating current applications. Furthermore, polar hydrocarbons are also likely to be incompatible (insoluble) in a non-polar polymer compositions used to fabricate electrical cable insulation. The absorption-promoting additive compound also preferably does not contain aromatic rings because these types of materials have been observed to exhibit limited solubility in the aliphatic polymers commonly used to form electrical cable insulation. Preferably, therefore, the additive is totally aliphatic, which is similar to the polymers used in the insulation compositions.

The additive should be able to readily penetrate the insulation polymer matrix. It is believed that as the additive penetrates into the polymer matrix, it tends to decreases the crystallinity of the polymer, thereby increasing the rate at which the peroxide compound can diffuse into the polymer particles. Lower molecular weight additives compounds, which penetrate into the insulation polymer matrix more easily than higher molecular weight additive compounds, are therefore preferred. Highly branched hydrocarbons are believed to be more effective in disrupting polymer crystallinity than straight-chain hydrocarbons.

The additive should be effective at low concentrations. Peroxide compounds are typically incorporated into polymer compositions used to form cable insulation at a 1% to 2% level, by weight. The additive should thus be effective at low loadings to prevent degradation of the electrical insulating and physical properties of the polymer composition. The additive should have little effect on the peroxide vulcanization process. It should not inhibit the cross-linking mechanism and its inclusion in the process should not require that additional peroxide be used to achieve the desired cross-link density.

The additive should have a low volatility. The absorption process is a closed system and the use of volatile additives could create an explosive vapor concentration. If the additive was volatile, it could present problems and safety hazards for the cable manufacturers since they use high temperatures during the fabrication and vulcanization of the final product.

Preferred alternative absorption-promoting additive compounds for use in the method of the invention include, for example, squalene (CAS#11-02-4) and polybutenes having a weight average molecular weight within the range of from about 300 to 1000. It is also possible to increase the absorption rate of peroxide compounds into polymer particles through the use of light mineral oil and heavy mineral oil, but very little, if any, improvement in peroxide cure is provided by the use of these materials.

The weight ratio of the peroxide compound to the absorption-promoting additive compound can be within the range of from about 1:1 to about 40:1. More preferably, the weight ratio of the peroxide compound to the additive compound is from about 3:2 to about 15:2. The amount of the peroxide compound used in the process should be the minimum amount necessary to obtain the desired peroxide cure. As noted, the presence of the absorption-promoting additive during the coating/absorption process usually facilitates use of less of the peroxide compound than if the additive was not present.

In the preferred method, the peroxide compound and the absorption-promoting additive are mixed together. If the absorption-promoting additive does not dissolve the peroxide compound, then the mixture can be heated until the peroxide compound melts and a liquid mixture is obtained. The mixture of the peroxide compound and the absorption-promoting additive can then be contacted with the polymer particles under physical mixing conditions (e.g., tumbling) to allow the mixture of the peroxide compound and the absorption-promoting additive to coat and absorb into the polymer particles.

Although it is less preferred, it will be appreciated that the peroxide compound and the absorption-promoting additive compound do not need to be pre-mixed, and that the two materials can be contacted with the polymer particles separately. The peroxide compound and the absorption-promoting additive can be contacted with the polymer particles simultaneously, or the absorption-promoting additive can be contacted with the polymer particles prior to contact with the peroxide compound. The physical mixing of the polymer particles provides sufficient mixing energy to mix the peroxide compound and the absorption-promoting additive together.

The present invention also provides a method of fabricating insulated electrical cables. The method comprises providing polymer particles that have absorbed a peroxide compound and an absorption-promoting additive comprising a branched, hydrocarbon oil. The peroxide-containing polymer particles are then melted in a screw feed and extruded coaxially onto a wire conductor or wire bundle. The polymer-coated wires are then passed through a catenary heated to a temperature sufficient to cause the peroxide in the extruded polymer to decompose and thereby cross-link the polymer.

The following examples are intended only to illustrate the invention and should not be construed as imposing limitations upon the claims.

Example 1

A 500 ml round-bottom flask was tilted on an angle and was continuously rotated using a rotary evaporator motor such that the opening of the flask remained in a fixed position. The bottom portion of the flask was partially immersed in a water bath maintained at 50° C. Polymer pellets, which were cylindrical in appearance and measured approximately ¼" long by ⅛" in diameter, were placed into the rotating flask. The polymer pellets were obtained from The Okonite Company of Ramsey, N.J. The specific composition of the polymer pellets is proprietary to The Okonite Company and is unknown to applicants, but the bulk of the polymer in the pellets is believed to be ethylene-propylene rubber (EPM). 1.5% by weight of dicumyl peroxide available as Di-CUP® R from Geo Specialty Chemicals, Inc. of Cleveland, Ohio was added to the flask. The 50° C. temperature was sufficient to melt the dicumyl peroxide, but it was not high enough to decompose the dicumyl peroxide. As the round bottom flask rotated slowly in the water bath, the molten peroxide initially caused the polymer pellets to adhere to the sides of the flask, including on the portion of the inner wall of the flask that rotated out of the water bath. The inside wall of the flask appeared to become "coated" with polymer pellets. As the dicumyl peroxide became absorbed into the polymer pellets over time, there was less molten or liquid dicumyl peroxide available to adhere the polymer pellets to the inside wall of the flask, so the pellets no longer stuck thereto and simply tumbled in the flask. The time that was required for the polymer pellets to stop sticking to the inside wall of the flask was recorded as the time required for complete absorption of the peroxide.

The same basic test procedure was then used to test a sample that included 0.5% by weight squalane, which was mixed with and added to the flask together with the dicumyl peroxide. Additional tests were later performed using the same basic test procedure and materials without and with squalane at 70° C. The test results are reported in Table 1a below:

TABLE 1a

|  | Test 1 | Test 2 | Test 3 | Test 4 |
|---|---|---|---|---|
| Polymer Pellets (wt. %) | 98.5 | 98.0 | 98.5 | 98.0 |
| Dicumyl Peroxide (wt. %) | 1.5 | 1.5 | 1.5 | 1.5 |
| Squalane (wt. %) | — | 0.5 | — | 0.5 |
| Contact Temperature (° C.) | 50 | 50 | 70 | 70 |
| Absorption Time (min.) | 12 | 7 | 5 | 4 |

The polymer particles from Test 1 and Test 2 were separately tested for peroxide cure at 360° F. using an oscillating disc rheometer (ODR) with a 1° Arc and a 12 minute motor. The results of the testing are shown in Table 1 b below.

TABLE 1b

|  | Test 1 | Test 2 |
|---|---|---|
| Polymer Pellets (wt. %) | 98.5 | 98.0 |
| Dicumyl Peroxide (wt. %) | 1.5 | 1.5 |
| Squalane (wt. %) | — | 0.5 |
| ODR Delta Torque (lb-in) | 10.75 | 16.19 |
| Ts2 (minutes) | 0.51 | 0.44 |
| T90 (minutes) | 3.29 | 2.85 |

The results shown in Table 1a demonstrate that the presence of a small amount of squalane during the absorption/coating process step significantly increases the rate at which dicumyl peroxide is absorbed into the polymer particles, both at 50° C. and at 70° C. The results shown in Table 1b demonstrate that squalane increases the efficacy of the peroxide cure because the ODR Delta Torque, which measures cross-link density, increased from 10.75 lb-in to 16.19 lb-in in the sample that included squalane. Thus, not only did the squalane increase the absorption rate of the dicumyl peroxide in the polymer particle, it also enhanced the peroxide cure.

Example 2

The same basic test procedure and materials used in Example 1 were used to test what effect use of a reduced amount of the dicumyl peroxide and squalane would have on the final product. The weight ratio of dicumyl peroxide to squalane was maintained at 3:1. The amount of polymer pellets, dicumyl peroxide and squalane used, and the test results obtained, are reported in Table 2 below:

TABLE 2

|  | Test 1 | Test 2 | Test 5 | Test 6 |
|---|---|---|---|---|
| Polymer Pellets (wt. %) | 98.5 | 98.0 | 98.5 | 99.0 |
| Dicumyl Peroxide (wt. %) | 1.5 | 1.5 | 1.13 | 0.75 |
| Squalane (wt. %) | — | 0.5 | 0.37 | 0.25 |
| Contact Temperature (° C.) | 50 | 50 | 50 | 50 |
| Absorption Time (min.) | 12 | 7 | 6 | 4 |
| ODR Delta Torque (lb-in) | 10.75 | 16.19 | 10.02 | 8.11 |
| Ts2 (minutes) | 0.51 | 0.44 | 0.55 | 0.63 |
| T90 (minutes) | 3.29 | 2.85 | 3.11 | 3.24 |

Table 2 shows that a lower amount of dicumyl peroxide and squalane is necessary to achieve the same peroxide cure as when no squalane is present, and that the same peroxide cure can be obtained in half the absorption time.

Example 3

The same basic test procedure and materials used in Example 1 were used to test what effect varying the concentration of dicumyl peroxide relative to the squalane would have on the final product. The amount of polymer pellets, dicumyl peroxide and squalane used, and the test results obtained, are reported in Table 3 below:

TABLE 3

|  | Test 1 | Test 2 | Test 7 | Test 8 | Test 9 | Test 10 |
|---|---|---|---|---|---|---|
| Polymer Pellets (wt. %) | 98.5 | 98.0 | 98.5 | 99.0 | 97.5 | 98.3 |
| Dicumyl Peroxide (wt. %) | 1.5 | 1.5 | 1.0 | 0.5 | 1.5 | 1.5 |
| Squalane (wt. %) | — | 0.5 | 0.5 | 0.5 | 1.0 | 0.2 |
| Weight Ratio (DP:S) | — | 3:1 | 2:1 | 1:1 | 3:2 | 15:2 |
| Contact Temperature (° C.) | 50 | 50 | 50 | 50 | 50 | 50 |
| Absorption Time (min.) | 12 | 7 | 4 | 3 | 9 | 10 |
| ODR Delta Torque (lb-in) | 10.75 | 16.19 | 10.69 | 7.99 | 12.34 | 13.82 |
| Ts2 (minutes) | 0.51 | 0.44 | 0.55 | 0.76 | 0.48 | 0.46 |
| T90 (minutes) | 3.29 | 2.85 | 3.00 | 3.26 | 3.03 | 2.98 |

Table 3 below shows that decreasing the dicumyl peroxide concentration relative to the squalane concentration tends to decrease the absorption time, but also reduces the peroxide cure.

Example 4

The same basic test procedure used in Example 1 was used to test the effectiveness of additives other than squalane. The amount of polymer pellets, dicumyl peroxide and additive used, and the test results obtained, are reported in Table 4 below:

TABLE 4

| | Test 1 | Test 2 | Test 11 | Test 12 | Test 13 | Test 14 |
|---|---|---|---|---|---|---|
| Polymer Pellets (wt. %) | 98.5 | 98.0 | 98.0 | 98.0 | 98.0 | 98.0 |
| Dicumyl Peroxide (wt. %) | 1.5 | 1.5 | 1.5 | 1.5 | 1.5 | 1.5 |
| Squalane | — | 0.5 | — | — | — | — |
| Squalene | — | — | 0.5 | — | — | — |
| Polybutene | — | — | — | 0.5 | — | — |
| Light Mineral Oil | — | — | — | — | 0.5 | — |
| Heavy Mineral Oil | — | — | — | — | — | 0.5 |
| Contact Temperature (° C.) | 50 | 50 | 50 | 50 | 50 | 50 |
| Absorption Time (min.) | 12 | 7 | 9 | 10 | 8 | 8 |
| ODR Delta Torque (lb-in) | 10.75 | 16.19 | 8.82 | 11.60 | 13.43 | 12.41 |
| Ts2 (minutes) | 0.51 | 0.44 | 0.70 | 0.50 | 0.48 | 0.48 |
| T90 (minutes) | 3.29 | 2.85 | 3.56 | 3.09 | 3.02 | 3.09 |

The data reported in Table 4 shows that all of the additives increase the rate at which dicumyl peroxide is absorbed into the polymer pellets as compared to when no additive is present, but none of the other additives provides the same degree of peroxide cure as is provided by squalane.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of fabricating insulated electrical cable, comprising:
   providing polymer particles that have absorbed a peroxide compound and an absorption-promoting additive comprising a branched, hydrocarbon oil, wherein the weight ratio of the peroxide compound to the absorption-promoting additive is within the range of from about 1:1 to about 40:1;
   melting the peroxide-containing polymer particles in a screw feed and coaxially extruding the molten peroxide-containing polymer onto a wire conductor or wire bundle; and
   passing the polymer-coated wire conductor or wire bundle through a catenary heated to a temperature sufficient to cause the peroxide in the extruded polymer to decompose and thereby cross-link the polymer.

2. The method according to claim 1 wherein the peroxide compound is dicumyl peroxide.

3. The method according to claim 1 wherein the absorption-promoting additive is squalane.

4. The method according to claim 1 wherein the absorption-promoting additive is a polybutene having a weight average molecular weight within the range of from about 300 to 1000.

5. The method according to claim 1 wherein the absorption-promoting additive is light mineral oil or heavy mineral oil.

6. The method according to claim 1 wherein the polymer particles comprise ethylene-propylene rubber.

7. The method according to claim 1 wherein the weight ratio of the peroxide compound to the absorption-promoting additive is within the range of from about 3:2 to about 15:2.

8. The method according to claim 1 wherein the peroxide compound and the absorption-promoting additive are pre-mixed together prior to being absorbed into the polymer particle.

9. The method according to claim 8 wherein the pre-mixed peroxide compound and absorption-promoting additive are heated until a homogenous liquid is obtained before being absorbed into the polymer particles.

10. The method according to claim 1 wherein the peroxide compound is dicumyl peroxide and wherein the absorption-promoting additive is squalane.

11. The method according to claim 10 wherein the amount of dicumyl peroxide absorbed into the polymer particle is from about 0.5% to about 2% by weight of the polymer particles.

12. The method according to claim 10 wherein the weight ratio of the dicumyl peroxide to the squalane is within the range of from about 3:2 to about 15:2.

13. A composition for use in forming electrical insulation on a conducting wire comprising polymer particles that have absorbed a peroxide compound and an absorption-promoting additive comprising a branched, hydrocarbon oil, wherein the weight ratio of the peroxide compound to the absorption-promoting additive is within the range of from about 1:1 to about 40:1.

14. The composition according to claim 13 wherein the peroxide compound is dicumyl peroxide.

15. The composition according to claim 13 wherein the absorption-promoting additive is squalane.

16. The composition according to claim 13 wherein the peroxide compound is dicumyl peroxide and wherein the absorption-promoting additive is squalane.

17. The composition according to claim 16 wherein the amount of dicumyl peroxide absorbed into the polymer particles is from about 015% to about 2% by weight of the polymer particles.

18. The composition according to claim 16 wherein the weight ratio of the dicumyl peroxide to the squalane is within the range of from about 3:2 to about 15:2.

* * * * *